March 21, 1950 — G. LUNDQUIST — 2,501,282
COMBINATION GARBAGE CAN AND RODENT TRAP
Filed Dec. 27, 1945
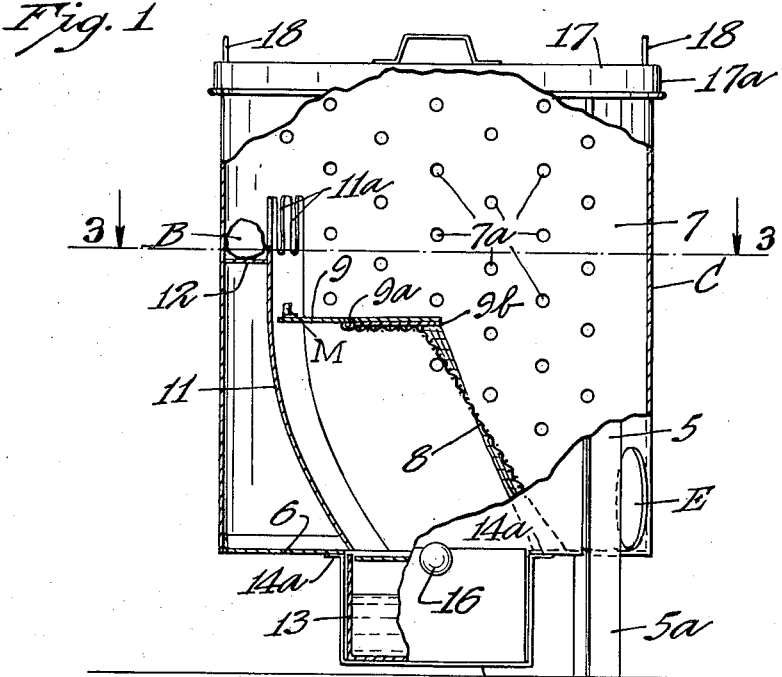
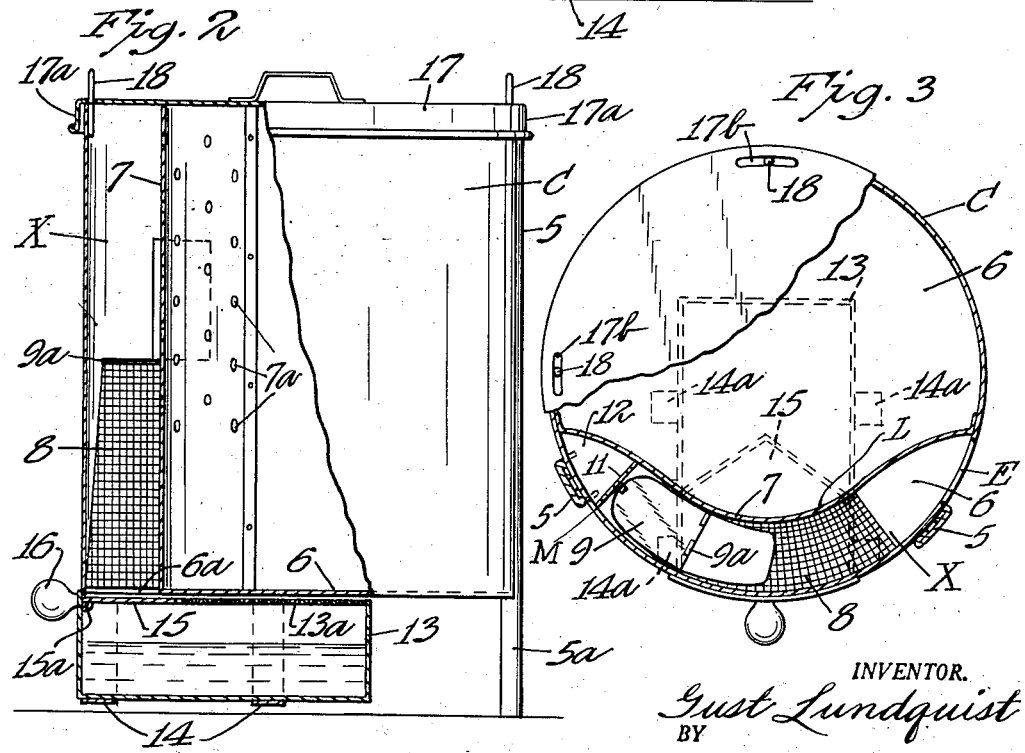
INVENTOR.
Gust Lundquist
BY
Williamson & Williamson
ATTORNEYS Patented Mar. 21, 1950

2,501,282

UNITED STATES PATENT OFFICE 2,501,282

COMBINATION GARBAGE CAN AND RODENT TRAP

Gust Lundquist, Forest Lake, Minn.

Application December 27, 1945, Serial No. 637,322

3 Claims. (Cl. 43—69)

This invention relates to apparatus for successfully trapping verminous rodents such as rats and particularly to a trap combined with a garbage container and utilizing as bait, the contents thereof.

For years, the problem of exterminating rats and other disease-carrying vermin in cities and villages and particularly, in metropolitan areas, has been a very serious one. Rats particularly, are very timid about entering a metal or wooden trap regardless of the bait used and most municipalities have ordinances preventing the distribution of poisoned food for killing or embalming the vermin. Such poisonous baits, usually in the form of poisoned grain, meat or other foods, are often eaten by children or domestic animals.

It is an object of my invention to provide a combined garbage can and rodent trap which may be manufactured at relatively low cost, adding only a small amount of expense to the cost of the conventional garbage container and being adapted without resetting, to successively trap and retain a number of rats, mice or other objectionable rodents.

More specifically, it is an object to provide in a garbage container, trapping mechanism wherein the odors from the garbage will thoroughly penetrate the trapping chamber and be communicated to the outside of the container adjacent the bottom thereof, through a rodent entrance and whereby a number of rodents may be successively trapped and captivated or drowned in a receptacle disposed below the trapping mechanism.

Extensive research as to the feeding and habits of rats conclusively shows that a substantial percentage of these animals obtain their food from garbage cans; does not hesitate to enter a can and learn to displace the covers thereon. The metal of the can does not intimidate these rodents as they are thoroughly accustomed to climbing up a can or jumping therein in their search for food.

These and other objects and advantages of my invention will be more apparent from the following description made in connection with the accompanying drawings wherein like reference characters refer to the same parts throughout the several views and in which—

Fig. 1 is a view partly in front elevation and particularly in vertical section of a garbage container embodying my invention, showing the interior of the trapping chamber with the mechanism mounted therein;

Fig. 2 is a view partly in side elevation and partly in vertical section through the trapping chamber and the captive receptacles therebelow; and Fig. 3 is a view partly in top plan and partly in horizontal cross section.

In the form of the invention illustrated, a cylindrical garbage container C of more or less conventional shape is utilized, being as shown, reinforced and supported by longitudinal strips 5 as shown, being made from sheet material, with the longitudinal edges thereof folded inwardly throughout the length of the container and with the lower portions of the strip 5 out-turned to underlie the bottom 6 of the container, constituting supporting legs 5a. The container is thus supported a short distance, say about six inches, above the ground or supporting surface. The bottom 6 of the container is cut adjacent its marginal edge at the front thereof to provide a curvilinear opening 6a, this opening being defined at its inner edge by a curved line L. Within container C, a perforated, vertical partition 7 is mounted, being formed in cross sectional shape corresponding to the line L of the bottom and extending as shown, the full height of the container. Partition 7 is provided with a multiplicity of staggered apertures 7a extending in series throughout the height thereof and also being arranged in longitudinally spaced series throughout substantially the width of the partition. Through these apertures, the strong odors from the garbage within the main portion of the container may pass into the chamber X defined by the said partition and the peripheral wall of the casing C.

Within chamber X an inclined, substantially spiral walk or track 8 is mounted transversely, preferably the full width of the passage and extending upwardly from the doorway or entrance E, formed as shown, by a suitably sized aperture in the peripheral wall of the container adjacent the bottom thereof and in communication with chamber X. The inclined walk 8 may be of any suitable construction which enables the rodent to grip and climb the same, such as a metal netting supported from the side walls of chamber X as by spot welding or other suitable means. A trap door 9 is intermediately and pivotally mounted at the upper end of the inclined walk 8, lying normally in horizontal position and as shown, having a weight 9b below its inner end to maintain a horizontal position. A horizontal detent or stop member M upturned from the partition L is engaged by the outer edge of trap door 9 limiting the upward movement thereof. The inner extremity of door 9 normally overlaps slightly, the upper edge of the inclined netting 8. Door 9, as shown, is intermediately pivoted on a pintle 9a which, as shown, is mounted in the side walls of the trapping chamber. A narrow partition or strip 11 is disposed longitudinally and transversely of the chamber X at the outer edge of the trap door 9, defining one of the ends of chamber X and forming in the medial and lower portion thereof, a curved shute or guide 10 which leads to the opening in the bottom of the container. If desired, the upper end of the strip portion 11 is trifurcated at 11a or otherwise foraminated, to permit odor of a special bait such as a piece of meat or corn B to diffuse through the upper portion of the chamber. A horizontal support 12 is provided in the form of an angle plate welded to the back of trip 11 upon which said bait may rest.

Extending transversely below the medial portion of the chamber X, I provide a removable rodent receptacle 13, as shown, in the form of an open top drawer supported and guided by suitable means such as a pair of U-shaped hanger straps 14 having out-turned attachment ends 14a which may be spot welded, soldered or otherwise secured to the underside of the bottom of the container. The receptacle or drawer 13 is of suitable dimensions to accommodate a number of rodents such as rats, say from six to ten and is preferably but not necessarily, imperforate so that it may contain water or a liquid poison solution for drowning or killing the trapped rodents. The receptacle or cage 13 is further provided at its top with a swinging trap door 15 which as shown, is hinged to the front side of the tray on pintles 15a and as shown, has a combined handle and weight 16 affixed to the front edge thereof which is adapted to return the trap door to normal horizontal position. The length of the trap door 15 is sufficient to slightly more than traverse and underlie the full width of chamber X and the balance of the top area of drawer 13 is covered by a partial stationary cover 13a. The drawer 13 with its contents, is readily removable from the container by horizontal sliding action thereof over the hanger straps 14.

In catching rats and certain other rodents, it is desirable to provide a cover structure for the container which may not be tipped off or easily removed. To this end, I have illustrated my container as provided with a top or closure cap 17 having a downturned flange 17a of conventional type adapted to telescope over the upper peripheral edge of the can. The marginal edge of the container proper as shown, is provided with two or more concentric slots 17b adapted to receive and accommodate a corresponding number of short, upstanding pins or studs 18 supported from the upper edge of the container. With this structure, the cover must be bodily lifted vertically some distance above the container before it may be removed, which may not be accomplished by a rat or other rodent.

In the use of my device, garbage is disposed in the large or main portion or chamber of container C and may be dumped therefrom by bodily picking up and dumping the entire container with or without detachment of the rodent receptacle or cage.

Rats and other verminous rodents accustomed to feeding from garbage pails are strongly attracted by the food odors which emanate outwardly and downwardly from the entrance 8 at the bottom of container C. The size of the aperture defining entrance 8 is preferably such that cats and gray squirrels will be excluded but that rats, mice and gophers may enter. The rodent is accustomed to going into a darkened hole and attracted by the odor, readily enters the chamber C, walking up the inclined track 8 in seeking to get at the food, the odors of which he continues to smell. The animal continues to climb the walk 8 until arriving at the top and still seeking to find the source of the odor above, he puts his weight upon the trap door 9, plunging downward against the trap door 15 of the cage or receptacle and falling into the receptacle where he is confined. I prefer to provide a receptacle 13 which will contain water or a poisonous liquid solution such as Paris green, whereby the trapped rodent will be speedily killed.

It will be obvious that no setting or resetting of my trap structure is required and that a plurality of rats or other rodents may be successfully trapped and confined within the drawer 13.

In the form of the invention illustrated, I provide additional bait B as an induced incentive for the rodent to travel beyond the upper end of the inclined walk onto the trap door 9, although satisfactory results have been attained without the inclusion of this feature.

While my structure is by no means limited to the particular type of trap door 9 illustrated, I prefer to utilize an intermediately pivoted door since the rat or other animal may very safely walk upon the rear end of the door and the moment its weight is disposed forwardly of the pivot, will plunge downwardly through the opening, the rear portion of the trap door at that time, being swung to assist in positively throwing the rodent into the space below.

The dead or captive rodents may be readily removed by withdrawal of the tray 13 from the container and if dead, they may be dumped when the garbage is collected, onto the truck or other collecting facilities. The upstanding curved partition L cooperates with its peripheral wall of the container C to define a trapping chamber in which is mounted the runway 8 as well as the trap door 9.

It will of course, be understood that various changes may be made in the form, details, arrangement and proportions of the parts without departing from the scope of my invention.

What I claim is:

1. A combination garbage can and rodent trap comprising an upstanding, cylindrical garbage container, an upstanding partition extending from the bottom of said container to a line medial of the height thereof and dividing the interior of said container into a relatively large garbage-receiving compartment and a narrow contiguous trapping chamber generally circumscribed within the cylindrical wall of the container, said partition having openings therethrough to enable odors from the garbage to penetrate said trapping chamber, said trapping chamber having a rodent entrance through the cylindrical wall of said container and at the lower portion thereof, an inclined walk within said chamber leading from said entrance to the upper portion thereof and a normally horizontal trap door mounted within the top of said trapping chamber at the upper end of said walk.

2. The structure set forth in claim 1, the bottom of said garbage container having an opening therein communicating with said trapping chamber a trap door mounted in said opening and a removable container mounted below said trap door.

3. Apparatus adapted to form, in conjunction with the interior of a conventional garbage can, a trap for rodents, comprising an upstanding partition adapted to be mounted within the cylindrical wall of a garbage can and extending from the bottom of said can to a point intermediate of the height thereof and defining in conjunction with said can, a narrow trapping chamber of generally sector shape and a main garbage-receiving compartment, an inclined walk connected with the outer side of said partition and extending from the lower end thereof to a point adjacent the top thereof and a trap door supported from said partition and disposed at the upper end of said inclined walk and adapted to substantially close the upper end of said trapping chamber.

GUST LUNDQUIST.

REFERENCES CITED

The following references are of record in the file of this patent:

UNITED STATES PATENTS

| Number | Name | Date |
|---|---|---|
| 1,020,341 | Barnhart | Mar. 12, 1912 |
| 1,223,873 | Hartt | Apr. 24, 1917 |
| 1,419,299 | Orbe | June 13, 1922 |
| 2,218,403 | McKee | Oct. 15, 1940 |